(12) United States Patent
Bosko et al.

(10) Patent No.: US 10,360,137 B2
(45) Date of Patent: Jul. 23, 2019

(54) ADAPTIVE TESTING USING DYNAMICALLY DETERMINED SYSTEM RESOURCES OF A COMPUTER SYSTEM

(71) Applicant: INTERNATIONAL BUSINESS MACHINES CORPORATION, Armonk, NY (US)

(72) Inventors: Heather M. Bosko, Poughkeepsie, NY (US); Deborah A. Furman, Poughkeepsie, NY (US); Bradley M. Messer, Poughkeepsie, NY (US); Anthony T. Sofia, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 15/194,903

(22) Filed: Jun. 28, 2016

(65) Prior Publication Data
US 2017/0371771 A1 Dec. 28, 2017

(51) Int. Cl.
G06F 11/36 (2006.01)
H04L 12/26 (2006.01)
H04L 12/24 (2006.01)

(52) U.S. Cl.
CPC ...... *G06F 11/3668* (2013.01); *G06F 11/3688* (2013.01); *H04L 41/5051* (2013.01); *H04L 43/50* (2013.01)

(58) Field of Classification Search
CPC ......... G06F 11/36–3696; G06F 9/3891; G06F 9/50–5077; G06F 11/3051
See application file for complete search history.

(56) References Cited

U.S. PATENT DOCUMENTS 8,479,164 B2    7/2013  Becker et al.
2005/0076009 A1*  4/2005  Yoshimura ........ G06F 17/30864
(Continued)

OTHER PUBLICATIONS

Bai, Xiaoying, et al. "Cloud testing tools.";Proceedings of 2011 IEEE 6th International Symposium on Service Oriented System (SOSE). IEEE (Year: 2011).*
(Continued)

*Primary Examiner* — Chameli Das
*Assistant Examiner* — Joanne G Macasiano
(74) *Attorney, Agent, or Firm* — Cantor Colburn LLP; William Kinnaman (57) ABSTRACT

Embodiments include methods, and adaptive testing systems, and computer program products for performing adaptive testing using one or more system resources of a computer system dynamically determined from a platform on which a test program is executing. Aspects include: test program sending a resource query based on certain criteria to a resource query module to inquire one or more available system resources of computer system, the resource query module using certain operating system commands of computer system to determine appropriate system resources available for use on the computer system, the computer system returning the appropriate system resources determined on the computer system to the resource query module of the test program, the test program deciding one or more system resources that best meet a need of the test program, and the test program performing the adaptive testing on the computer system based on the one or more system resources decided.

16 Claims, 3 Drawing Sheets

(56) References Cited

U.S. PATENT DOCUMENTS

| | | | |
|---|---|---|---|
| 2008/0244524 A1 | 10/2008 | Kelso | |
| 2008/0244525 A1* | 10/2008 | Khalil | G06F 11/3688 717/124 |
| 2009/0259624 A1* | 10/2009 | DeMaris | G06F 17/30448 |
| 2010/0161307 A1* | 6/2010 | Bharadwaj | G06F 11/3664 703/21 |
| 2013/0139130 A1* | 5/2013 | Anjan | G06F 11/3672 717/131 |
| 2015/0264590 A1 | 9/2015 | Michl et al. | |

OTHER PUBLICATIONS

Calheiros, Rodrigo N., et al. "CloudSim: a toolkit for modeling and simulation of cloud computing environments and evaluation of resource provisioning algorithnns.";Software: Practice and experience;41.1: p. 23-50. (Year: 2011).*

Authors et al., "System and Method for Assigning Test Priority in a Cloud Environment," IP.com No. IPCOM000242989D, Sep. 6, 2015, pp. 1-5.

Authors et al., "System, Method and Apparatus for Specializing Dynamic Software Testing according to Coding Hints," IP.com No. IPCOM000238063D, Jul. 30, 2014, pp. 1-4.

Xie et al., "A Dynamic Optimization Strategy for Evolutionary Testing," 12th Asia-Pacific Software Engineering Conference (APSEC'05), IEEE, Computer Societ, 2005, pp. 1-8.

* cited by examiner

ADAPTIVE TESTING USING DYNAMICALLY DETERMINED SYSTEM RESOURCES OF A COMPUTER SYSTEM

BACKGROUND

The present disclosure relates generally to testing of a computer system, and more particularly to methods, adaptive testing systems, and computer program products of adaptive testing using dynamically determined system resources of the computer system.

When designing test programs for a software system, software developers as well as testing engineers usually need to study a design, define a set of variations, and build test programs for each variation. Later on, these test programs are incorporated into a regression bucket run against the product throughout the software development life-cycle.

Unfortunately, when originally built, developers and/or testing engineers utilize their own configuration. When someone else desires to run the test program, he/she likely must manually edit source code so it operates with his/her configuration.

For example, as a test program is moved from one environment to another, resources required for testing or resources under testing may have different naming conventions; so, should a test program look for a hard-coded name, it could fail despite no conceptual change in the test. As implied above, test case mobility is further hampered when moving between multiple environments such as functional testing environment, system testing environment, and performance testing environment. Each level of testing is required to meet certain predetermined standards, but much time is spent moving test cases between these testing environments. At some point, a tester may decide that effort should be directed towards writing a new test case than towards porting an old one. Unfortunately, this also introduces some possibility of error. If a test case doesn't communicate intent well, then a test could be misinterpreted and rewritten incorrectly for a new system. While this isn't necessarily likely, there is still an opportunity cost associated with rewriting the test. Therefore, it is desirable to create a test program that can perform adaptive testing using one or more system resources of a computer system dynamically determined from any platforms or any environments on which the test program is executing.

Therefore, heretofore unaddressed needs still exist in the art to address the aforementioned deficiencies and inadequacies.

SUMMARY

In one aspect, the present disclosure relates to a method of adaptive testing using dynamically determined system resources of the computer system. In certain embodiments, the method may include: an adaptive testing module of a test program sending at least one resource query based on one or more criteria to a resource query module of the test program through a query request transmission module to inquire one or more available system resources of the computer system, the resource query module of the test program using one or more operating system commands of the computer system to determine appropriate system resources available for use on the computer system, an operating system of the computer system returning the appropriate system resources determined on the computer system to the resource query module of the test program, a query results selection module receiving the appropriate system resources determined on the computer system through a query results receiving module, and deciding one or more system resources that best meet a need of the test program to the adaptive testing module, and the adaptive testing module performing the adaptive testing on the computer system based on the one or more system resources decided.

In another aspect, the present disclosure relates to an adaptive testing system. In certain embodiments, the adaptive testing system may include a computer system, and a test program executing on the computer system. The computer system may include one or more computers, and each of the one or more computers has at least one processor, and a non-transitory storage medium storing an operating system, the test program, and computer executable instructions. When the computer executable instructions are executed at the at least one processor, the computer executable instructions cause the processor to perform a method of adaptive testing using dynamically determined system resources of the computer system. The method may include: an adaptive testing module of a test program sending at least one resource query based on one or more criteria to a resource query module of the test program through a query request transmission module to inquire one or more available system resources of the computer system, the resource query module of the test program using one or more operating system commands of the computer system to determine appropriate system resources available for use on the computer system, an operating system of the computer system returning the appropriate system resources determined on the computer system to the resource query module of the test program, a query results selection module receiving the appropriate system resources determined on the computer system through a query results receiving module, and deciding one or more system resources that best meet a need of the test program to the adaptive testing module, and the adaptive testing module performing the adaptive testing on the computer system based on the one or more system resources decided.

In yet another aspect, the present disclosure relates to a computer program product executable on an adaptive testing system. In certain embodiments, the computer program product may include a non-transitory computer storage medium readable by the adaptive testing system having a processor and a memory storing an operating system, a test program, and computer executable instructions for execution by the processor of the adaptive testing system for performing a method of adaptive testing using dynamically determined system resources of the computer system. The method may include: an adaptive testing module of a test program sending at least one resource query based on one or more criteria to a resource query module of the test program through a query request transmission module to inquire one or more available system resources of the computer system, the resource query module of the test program using one or more operating system commands of the computer system to determine appropriate system resources available for use on the computer system, an operating system of the computer system returning the appropriate system resources determined on the computer system to the resource query module of the test program, a query results selection module receiving the appropriate system resources determined on the computer system through a query results receiving module, and deciding one or more system resources that best meet a need of the test program to the adaptive testing module, and the adaptive testing module performing the adaptive testing on the computer system based on the one or more system resources decided.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the present disclosure is particularly pointed out and distinctly claimed in the claims at the conclusion of the specification. The foregoing and other features and advantages of the present disclosure are apparent from the following detailed description taken in conjunction with the accompanying drawings in which:

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-3, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Figure 1:
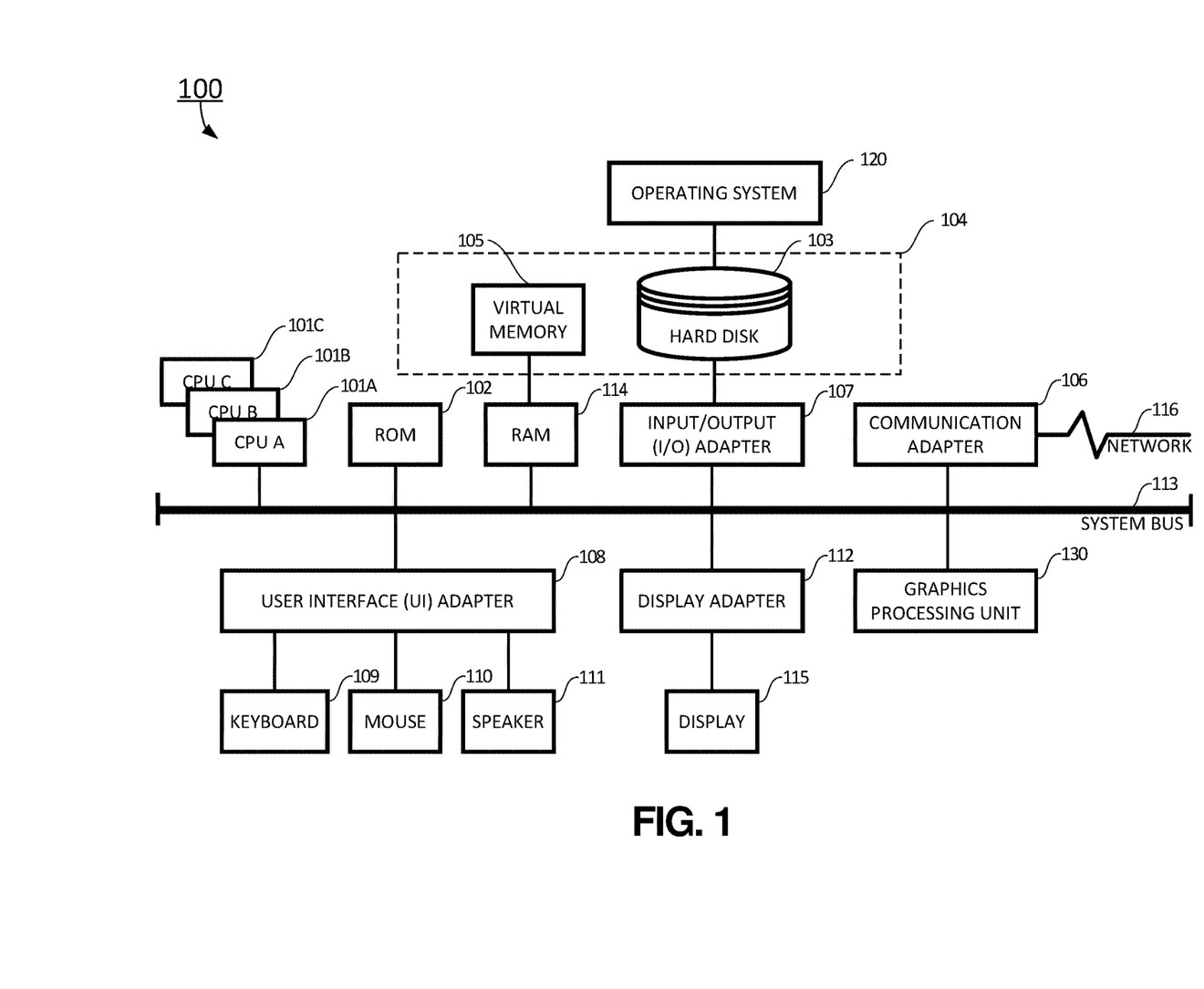
FIG. 1 is a block diagram illustrating an exemplary computer system of performing adaptive testing using dynamically determined system resources of the computer system according to certain embodiments of the present disclosure.

Referring to FIG. 1, there is shown an embodiment of a computer system 100 of performing adaptive testing using dynamically determined system resources of the computer system 100 and implementing the teachings herein. In this embodiment, the computer system 100 has one or more central processing units (CPU, or processors) 101A, 101B, 101C, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

Conventionally, test program are usually written in a static form, and it includes many statically defined the resources within the system it is running on. It may have a variable such as a device name, and/or internet protocol (IP) address so the device may be accessed by a computer system. For example, when a test program is written to perform a functional test of software in a first test environment, the test program may define three computers having device names A, B, and C, with IP addresses AA, AB, and AC, respectively. Once the functional test is completed, the test program may be used to perform system test in a second test environment where similar three computers are defined as D, E, and F, with IP addresses AD, AE, and AF, respectively. If the test program is not manually edited to adapt to the second test environment, such a system test may fail because system resources such as computers are configured differently. Although it is the same test program, the test may fail because the first and the second test environments will be using different device names, or whatever resources we are looking for, whether it is a dataset name, a device, a thread, or hardware components.

Therefore, it is desirable to be platform agnostic such that each test program will adapt to use the resources dynamically determined from the platform on which the test program is executing.

Figure 2:
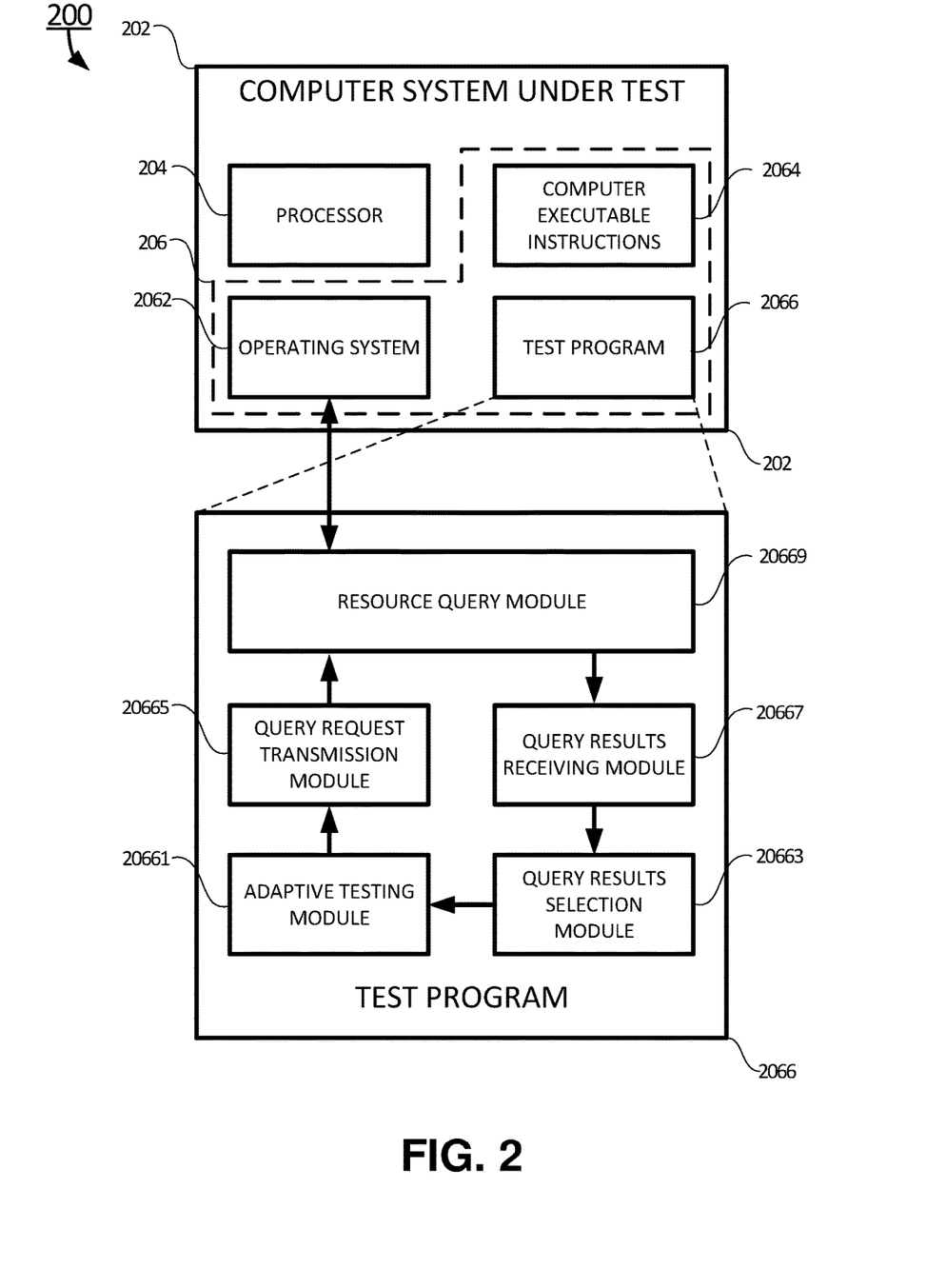
FIG. 2 is a block diagram of an exemplary adaptive testing system for performing adaptive testing using dynamically determined system resources of the computer system according to certain exemplary embodiments of the present disclosure.

In one aspect, the present disclosure relates to an adaptive testing system 200 as shown in FIG. 2. In certain embodiments, the adaptive testing system 200 may include a computer system 202, and a test program 2066 executing on the computer system 202. The computer system may include one or more computers as depicted in FIG. 1, and each of the one or more computers has at least one processor 204, and a non-transitory storage medium 206 storing an operating system 2062, computer executable instructions 2064 and the test program 2066. When the computer executable instructions 2064 and the test program 2066 are executed at the at least one processor 204, the computer executable instructions 2064 and the test program 2066 are executed at the at least one processor 204 cause the processor 204 to perform adaptive testing using dynamically determined system resources of the computer system 202.

In certain embodiments, the test program 2066 may include: an adaptive testing module 20661, a query request transmission module 20665, a resource query module 20669, a query results receiving module 20667, and a query results selection module 20663.

In certain embodiments, the adaptive testing module 20661 is configured to initiate an adaptive testing on the computer system 202. The adaptive testing module 20661 may request one or more queries to inquire one or more system resources of the computer system 202, and perform adaptive testing using dynamically determined system resources of the computer system 202.

The query request transmission module 20665 may be configured to receive a command from the adaptive testing module 20661 to perform a resource query to find out system resources, various parameters and configurations of the system resources available in the computer system 202. The resource query may be performed by the resource query module 20669. When the query request transmission module 20665 receives the command from the adaptive testing module 20661 to perform a resource query, the query request transmission module 20665 may send the one or more queries to the resource query module 20669. When the resource query module 20669 receives the one or more queries from the query request transmission module 20665, the resource query module 20669 may use one or more operating system commands to determine appropriate system resources available on the computer system 202, and receive the appropriate system resources determined on the computer system 202.

In certain embodiments, once the resource query is completed, the resource query results including the system resources, various parameters and configurations of the system resources available on the computer system 202 are returned back to the resource query module 20669. The resource query module 20669 may forward the resource query results to the query results receiving module 20667. The query results receiving module 20667 receives the appropriate system resources determined on the computer system through the resource query module 20669. The query results receiving module 20667 may forward the appropriate system resources determined on the computer system 202 through the resource query module 20669 to the query results selection module 20663.

In certain embodiments, the query results selection module 20663 may select one or more system resources received by the query results receiving module that best meet the need of the test program for the adaptive testing module to test the computer system 202 using the one or more system resources selected.

In certain embodiments, the resource query module 20669 may go through all available system resources on the computer system 202 to determine appropriate system resources available for use on the computer system.

In certain embodiments, the adaptive testing may include: one or more functional tests on the computer system 202, one or more system tests on the computer system 202, and one or more performance tests on the computer system 202. In certain embodiments, the adaptive testing module 20661 may be configured to request additional queries to narrow down the one or more system resources of the computer system received when the appropriate system resources received contain more than a predetermined amount of system resources, until the appropriate system resources received are less than or equal to the predetermined amount of system resources.

In another aspect, the present disclosure relates to a method of adaptive testing using dynamically determined system resources of the computer system. In certain embodiments, the method may include: the test program 2066 sending at least one resource query based on one or more criteria to a resource query module 20669 of the test program 2066 to inquire one or more available system resources of the computer system 200, the resource query module 20669 of the test program 2066 using one or more operating system 2062 commands of the computer system 202 to determine appropriate system resources available for use on the computer system, the computer system 202 returning the appropriate system resources determined on the computer system to the resource query module 20669 of the test program 2066, the test program 2066 deciding one or more system resources that best meet a need of the test program 2066, and the test program 2066 performing the adaptive testing on the computer system 202 based on the one or more system resources decided.

In certain embodiments, the one or more criteria may include: numbers of basic devices defined in the computer system, amount of system resources defined in the computer system, whether the system resources are in-use, and whether the system resources are being shared among a plurality of computer systems.

In certain embodiments, the system resources of the computer system 202 may include: one or more computers, one or more processors, one or more file systems, one or more operating systems, one or more storage devices, one or more memory blocks, one or more peripheral cards, one or more power supply modules, one or more printing devices, one or more datasets, one or more switches, one or more routers, one or more Wi-Fi access points, and any combinations of the system resources listed.

In certain embodiments, the test program 2066 may go through all available system resources on the computer system 202 to determine appropriate system resources. The test program 2066 may perform: one or more functional tests on the computer system 202, one or more system tests on the computer system 202, and one or more performance tests on the computer system 202.

In certain embodiments, the test program 2066 may include: the adaptive testing module 20661, the query request transmission module 20665, the resource query module 20669, the query results receiving module 20667, and the query results selection module 20663.

The adaptive testing module 20661 may request one or more queries to inquire the one or more system resources of the computer system 202, and perform the adaptive testing using dynamically determined system resources of the computer system 202. The query request transmission module 20665 may send the one or more queries to the resource query module 20669. The resource query module 20669 may receive the one or more queries from the query request transmission module 20665, use the one or more operating system 2062 commands to determine appropriate system resources available for use on the computer system 202, and receive the appropriate system resources determined on the computer system 202. The query results receiving module 20667 may receive the appropriate system resources determined on the computer system through the resource query module 20669. The query results selection module 20663 may select one or more system resources that best meet the need of the test program 2066.

In certain embodiments, the computer system 202 may include: one or more computers, each of the one or more computers having at least one processor 204, and a non-transitory storage medium 206 storing an operating system 2062, the test program 2066, and computer executable instructions 2064. When executed at the at least one processor 204, the computer executable instructions 2064 and the test program 2066 cause the processor 204 to perform adaptive testing using dynamically determined system resources of the computer system 202.

Figure 3:
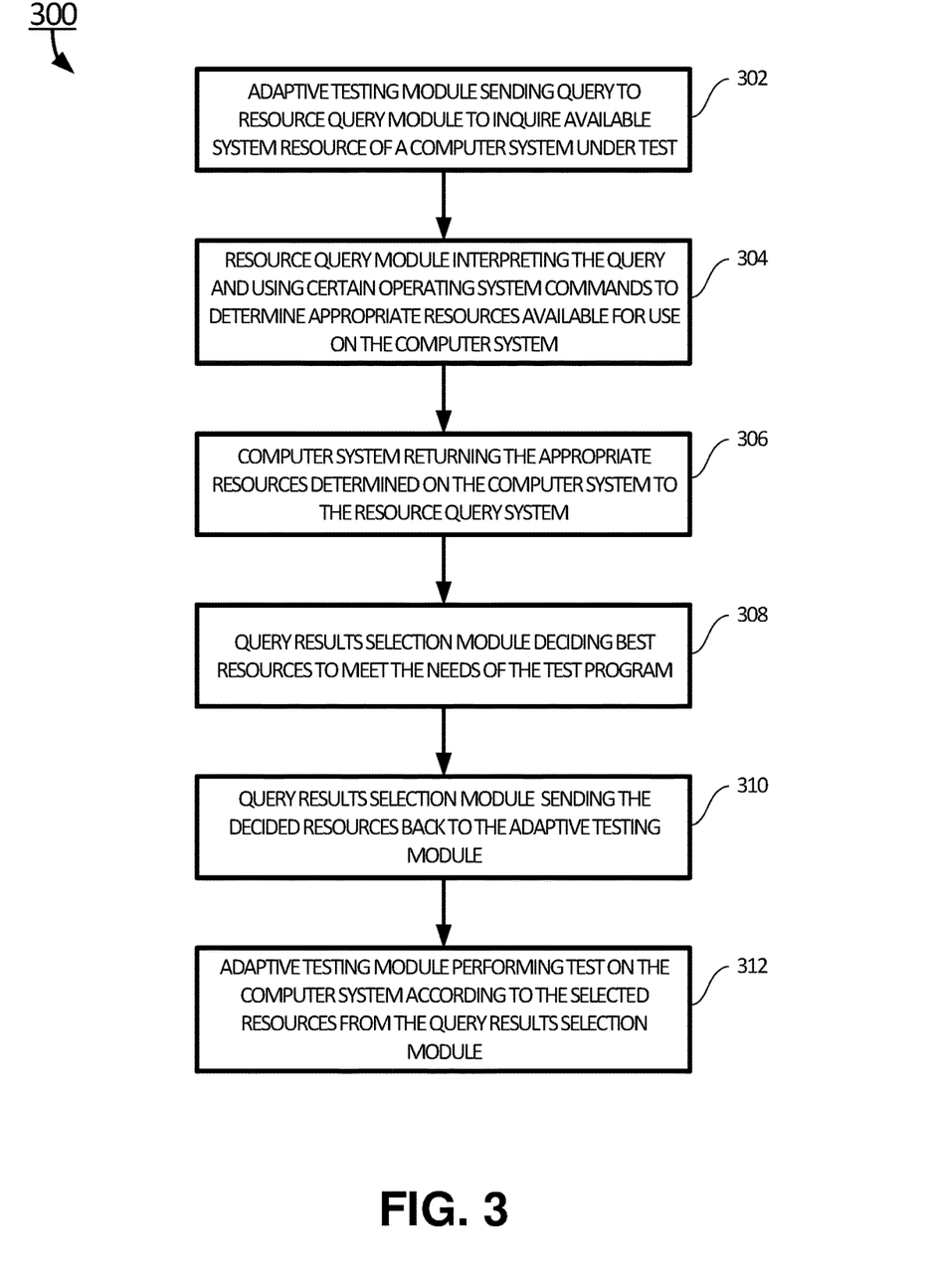
FIG. 3 is a flow chart of an exemplary method of performing adaptive testing using dynamically determined system resources of the computer system according to certain embodiments of the present disclosure.

Referring now to FIG. 3, a flow chart of an exemplary method 300 of performing adaptive testing using dynamically determined system resources of the computer system is shown according to certain embodiments of the present disclosure.

At block 302, the adaptive testing module 20661 of the test program 2066 may initiate an adaptive testing on the computer system 202. The adaptive testing module 20661 may request one or more queries to inquire one or more system resources of the computer system 202 through the query request transmission module 20665, and perform adaptive testing using dynamically determined system resources of the computer system 202.

The query request transmission module 20665 may be configured to receive a command from the adaptive testing module 20661 to perform a resource query to find out system resources, various parameters and configurations of the system resources available in the computer system 202. The resource query may be performed by the resource query module 20669. When the query request transmission module 20665 receives the command from the adaptive testing module 20661 to perform a resource query, the query request transmission module 20665 may send the one or more queries to the resource query module 20669.

At block 304, when the resource query module 20669 receives the one or more queries from the query request transmission module 20665, the resource query module 20669 may use one or more commands of the operating system 2062 to determine appropriate system resources available on the computer system 202, and receive the appropriate system resources determined on the computer system 202.

In certain embodiments, the resource query module 20669 may go through all available system resources on the computer system 202 to determine appropriate system resources available for use on the computer system 202.

The operating system 2062 of the computer system 202 may return the appropriate system resources available on the computer system 202 to the resource query module 20669, in response to the one or more queries from the query request transmission module 20665.

At block 306, in certain embodiments, once the one or more resource queries are completed, the resource query results including the system resources, various parameters and configurations of the system resources available on the computer system 202 are returned back to the resource query module 20669. The resource query module 20669 may forward the resource query results to the query results receiving module 20667. The query results receiving module 20667 receives the appropriate system resources determined on the computer system 202 through the resource query module 20669. The query results receiving module 20667 may forward the appropriate system resources determined on the computer system 202 through the resource query module 20669 to the query results selection module 20663.

At block 308, the query results selection module 20663 may select one or more system resources received by the query results receiving module 20667 that best meet the need of the test program 2066 for the adaptive testing module 20661 to test the computer system 202 using the one or more system resources selected.

At block 310, the query results selection module 20663 may send the one or more system resources selected by the query results selection module 20663 that best meet the need of the test program 2066 for the adaptive testing module 20661 to the adaptive testing module 20661.

At block 312, the adaptive testing module 20661 may test the computer system 202 based on the one or more system resources selected by the query results selection module 20663 that best meet the need of the test program 2066 for the adaptive testing module 20661.

In certain embodiments, the adaptive testing may include: one or more functional tests on the computer system 202, one or more system tests on the computer system 202, and one or more performance tests on the computer system 202. In certain embodiments, the adaptive testing module 20661 may be configured to request additional queries to narrow down the one or more system resources of the computer system received when the appropriate system resources received contain more than a predetermined amount of system resources, until the appropriate system resources received are less than or equal to the predetermined amount of system resources.

In yet another aspect, the present disclosure relates to a computer program product executable on an adaptive testing system. In certain embodiments, the computer program product may include a non-transitory computer storage medium readable by the adaptive testing system having a processor and a memory storing an operating system, a test program, and computer executable instructions for execution by the processor of the adaptive testing system for performing a method of adaptive testing using dynamically determined system resources of the computer system. The method may include: the test program sending at least one resource query based on one or more criteria to a resource query module of the test program to inquire one or more available system resources of the computer system, the resource query module of the test program using one or more operating system commands of the computer system to determine appropriate system resources available for use on the computer system, the computer system returning the appropriate system resources determined on the computer system to the resource query module of the test program, the test program deciding one or more system resources that best meet a need of the test program, and the test program performing the adaptive testing on the computer system based on the one or more system resources decided.

The present disclosure may be a computer system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions available for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of adaptive testing using dynamically determined system resources of a computer system, the computer system comprising a test program, the test program comprising an adaptive testing module and a query request transmission module, the method comprising:

in response to receiving, by the query request transmission module, a first query request sent by the adaptive testing module, sending, by the query request transmission module, a first resource query based on one or more criteria to inquire about one or more available system resources of the computer system;

in response to receiving the first resource query, determining, using one or more operating system commands of the computer system, appropriate system resources available for use on the computer system;

receiving the appropriate system resources determined on the computer system and selecting system resources that best meet a need of the test program, wherein the system resources that are selected for best meeting the need of the test program include one or more power supply modules and one or more printing devices, wherein the one or more criteria at least include whether the one or more power supply modules and the one or more printing devices are in-use and whether the one or more power supply modules and the one or more printing devices are being shared among a plurality of computer systems;

sending the selected system resources to the adaptive testing module;

after receiving the selected system resources at the adaptive testing module, sending, by the adaptive testing module, a second query request to the query request transmission module to narrow down the selected system resources of the computer system received by the adaptive testing module when the selected system resources of the computer systems contain more than a predetermined amount of system resources, until the selected system resources are less than or equal to the predetermined amount of system resources; and performing the adaptive testing on the computer system based on the narrowed down selected one or more system resources, wherein the test program performs:

one or more functional tests on the computer system;

one or more system tests on the computer system; and one or more performance tests on the computer system.

2. The method of claim 1, wherein the one or more criteria further comprise:

numbers of basic devices defined in the computer system; and amount of the system resources defined in the computer system.

3. The method of claim 1, wherein the selected system resources of the computer system further comprise:

one or more computers;
one or more processors;
one or more file systems;
one or more operating systems;
one or more storage devices;
one or more memory blocks;
one or more peripheral cards;
one or more datasets;
one or more switches;
one or more routers;
one or more Wi-Fi access points; or
any combination thereof.

4. The method of claim 1, wherein the using the one or more operating system commands to determine appropriate system resources comprises:

going through all available system resources on the computer system.

5. The method of claim 1, wherein the test program comprises:

the adaptive testing module configured to request one or more queries to inquire about one or more system resources of the computer system, and perform the adaptive testing using dynamically determined system resources of the computer system, wherein the one or more queries include the first query request and the second query request;

the query request transmission module configured to send the one or more queries to the resource query module;

the resource query module configured to receive the one or more queries from the query request transmission module, use the one or more operating system commands to determine appropriate system resources available for use on the computer system, and receive the appropriate system resources determined on the computer system;

a query results receiving module configured to receive the appropriate system resources determined on the computer system through the resource query module; and a query results selection module configured to select one or more system resources that best meet the need of the test program and sending the one or more system resources selected to the adaptive testing module for adaptive test of the computer system.

6. The method of claim 1, wherein the computer system comprises:

one or more computers, each of the one or more computers having at least one processor, and a non-transitory storage medium storing an operating system, the test program, and computer executable instructions, wherein when executed at the at least one processor, the computer executable instructions cause the processor to perform the adaptive testing using dynamically determined system resources of the computer system.

7. An adaptive testing system, comprising:

a computer system, wherein the computer system comprises one or more computers, each of the one or more computers having at least one processor, and a non-transitory storage medium storing an operating system, and computer executable instructions, wherein when executed at the at least one processor, the computer executable instructions cause the processor to perform adaptive testing using dynamically determined system resources of the computer system; and a test program executing on the computer system, wherein the test program comprises:

an adaptive testing module sending a first query request to a query transmission module of the test program;

in response to receiving the first query request sent by the adaptive testing module, a query transmission module of the test program sending a first resource query based on one or more criteria to a resource query module of the test program to inquire about one or more available system resources of the computer system;

in response to receiving the first resource query sent by the query transmission module, the resource query module of the test program determining, using one or more operating system commands of the computer system, appropriate system resources available for use on the computer system;

a query results selection module receiving the appropriate system resources determined on the computer system through a query results receiving module, selecting system resources that best meet a need of the test program to send to the adaptive testing module, and sending the system resources to the adaptive testing module, wherein the system resources that are selected for best meeting the need of the test program include one or more power supply modules and one or more printing devices, wherein the one or more criteria at least include whether the one or more power supply modules and the one or more printing devices are in-use and whether the one or more power supply modules and the one or more printing devices are being shared among a plurality of computer systems; and after receiving the selected one or more system resources, the adaptive testing sending a second query request to the query request transmission module to narrow down the selected system resources of the computer system received by the adaptive testing module when the selected system resources of the computer systems contain more than a predetermined amount of system resources, until the selected system resources are less than or equal to the predetermined amount of system resources;

the adaptive testing module performing the adaptive testing on the computer system based on the narrowed down selected one or more system resources, wherein the test program performs:

one or more functional tests on the computer system;
one or more system tests on the computer system; and
one or more performance tests on the computer system.

8. The adaptive testing system of claim 7, wherein the one or more criteria further comprise:

numbers of basic devices defined in the computer system; and
amount of the system resources defined in the computer system.

9. The adaptive testing system of claim 7, wherein the selected system resources of the computer system further comprise:

the one or more computers;
one or more processors;
one or more file systems;
one or more operating systems;
one or more storage devices;
one or more memory blocks;
one or more peripheral cards;
one or more datasets;
one or more switches;
one or more routers;
one or more Wi-Fi access points; or
any combination thereof.

10. The adaptive testing system of claim 8, wherein the resource query module is configured to go through all available system resources on the computer system.

11. A computer program product operable on an adaptive testing system, comprising a non-transitory computer storage medium readable by the adaptive testing system having a processor and a memory configured to store an operating system, a test program and computer executable instructions for execution by the processor of the adaptive testing system for performing a method of adaptive testing using dynamically determined system resources of a computer system, the test program comprising an adaptive testing module and a query request transmission module, the method performed by the processor comprising:

in response to receiving, by the query request transmission module, a first query request sent by the adaptive testing module, sending a first resource query based on one or more criteria to inquire about one or more available system resources of the computer system;

in response to receiving the first resource query, determining, using one or more operating system commands of the computer system, appropriate system resources available for use on the computer system;

receiving the appropriate system resources determined on the computer system and selecting one or more system resources that best meet a need of the test program, wherein the system resources that are selected for best meeting the need of the test program include one or more power supply modules and one or more printing devices, wherein the one or more criteria at least include whether the one or more power supply modules and the one or more printing devices are in-use and whether the one or more power supply modules and the one or more printing devices are being shared among a plurality of computer systems;

sending the selected system resources to the adaptive testing module;

after receiving the selected system resources at the adaptive testing module, sending, by the adaptive testing module, a second query request to the query request transmission module to narrow down the selected system resources of the computer system received by the adaptive testing module when the selected system resources of the computer systems contain more than a predetermined amount of system resources, until the selected system resources are less than or equal to the predetermined amount of system resources; and performing the adaptive testing on the computer system based on the narrowed down selected one or more system resources, wherein the test program performs:
one or more functional tests on the computer system;
one or more system tests on the computer system; and
one or more performance tests on the computer system.

12. The computer program product of claim 11, wherein the one or more criteria further comprise:
numbers of basic devices defined in the computer system; and
amount of the system resources defined in the computer system.

13. The computer program product of claim 11, wherein the selected system resources of the computer system further comprise:
one or more computers;
one or more processors;
one or more file systems;
one or more operating systems;
one or more storage devices;
one or more memory blocks;
one or more peripheral cards;
one or more datasets;
one or more switches;
one or more routers;
one or more Wi-Fi access points; or
any combination thereof.

14. The computer program product of claim 11, wherein the using the one or more operating system commands to determine appropriate system resources comprises:
going through all available system resources on the computer system.

15. The computer program product of claim 11, wherein the test program comprises:
the adaptive testing module configured to request one or more queries to inquire about one or more system resources of the computer system, and perform adaptive testing using dynamically determined system resources of the computer system, wherein the one or more queries include the first query request and the second query request;
the query request transmission module configured to send the one or more queries to the resource query module;
a resource query module configured to receive the one or more queries from the query request transmission module, use the one or more operating system commands to determine appropriate system resources available for use on the computer system, and receive the appropriate system resources determined on the computer system;
a query results receiving module configured to receive the appropriate system resources determined on the computer system through the resource query module; and
a query results selection module configured to select one or more system resources that best meet the need of the test program.

16. The computer program product of claim 11, wherein the computer system comprises:
one or more computers, each of the one or more computers having at least one processor, and a non-transitory storage medium storing an operating system, the test program, and computer executable instructions, wherein when executed at the at least one processor, the computer executable instructions cause the processor to perform the adaptive testing using dynamically determined system resources of the computer system.

\* \* \* \* \*